United States Patent
Laveuve et al.

(10) Patent No.: US 9,611,911 B2
(45) Date of Patent: Apr. 4, 2017

(54) SPRING ELEMENT

(71) Applicant: Fraunhofer-Gesellschaft zur Foerderung der angewandten Forschung e.V., Munich (DE)

(72) Inventors: Dominik Laveuve, Darmstadt (DE); Paul Becker, Weiterstadt (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/554,028

(22) Filed: Nov. 25, 2014

(65) Prior Publication Data

US 2015/0145192 A1    May 28, 2015

(30) Foreign Application Priority Data

Nov. 28, 2013 (DE) .................. 10 2013 224 442

(51) Int. Cl.
| | |
|---|---|
| *F16F 1/366* | (2006.01) |
| *B60G 11/00* | (2006.01) |
| *F16F 1/36* | (2006.01) |
| *F16F 1/371* | (2006.01) |

(52) U.S. Cl.
CPC .............. *F16F 1/366* (2013.01); *B60G 11/00* (2013.01); *F16F 1/3605* (2013.01); *F16F 1/371* (2013.01); *B60G 2202/14* (2013.01); *B60G 2206/71* (2013.01)

(58) Field of Classification Search
CPC .......... F16F 1/3605; F16F 1/371; F16F 1/366; B60G 11/00; B60G 2206/71; B60G 2202/14; B60G 11/22

USPC .................... 267/292, 153, 139, 140, 69, 73
See application file for complete search history.

(56) References Cited

U.S. PATENT DOCUMENTS

| | | | | |
|---|---|---|---|---|
| 1,735,899 A | * | 11/1929 | Henry .................... | B60G 11/42 267/141 |
| 2,991,524 A | * | 7/1961 | Dobrikin .................. | B60J 7/104 105/377.02 |
| 3,879,024 A | * | 4/1975 | Scott ........................ | F16F 3/12 267/140.4 |
| 4,770,290 A | * | 9/1988 | Eroskey .................. | B29C 39/14 198/847 |
| 4,854,556 A | * | 8/1989 | Pietrzak .................... | F16F 7/14 248/570 |

(Continued)

FOREIGN PATENT DOCUMENTS

| | | | | |
|---|---|---|---|---|
| DE | 4035231 A1 | * | 5/1992 | ............... F16C 1/10 |
| DE | 4035231 C2 | | 5/1992 | |

(Continued)

OTHER PUBLICATIONS

Machine Translation in English for DE 4035231A1, Inventor: Wolf et al., 3 pages; Retrieve Date Dec. 18, 2015.*

*Primary Examiner* — Thomas J Williams
*Assistant Examiner* — Mariano Sy
(74) *Attorney, Agent, or Firm* — Faegre Baker Daniels LLP

(57) ABSTRACT

A spring element that includes a spring body that is at least chiefly formed from an elastomer, wherein at least one reinforcement fiber is embedded into the elastomer. The at least one reinforcement fiber has an arcuate course in a non-loaded condition of the spring element, so that the spring element has a non-linear spring characteristic.

16 Claims, 4 Drawing Sheets

(56) References Cited

U.S. PATENT DOCUMENTS

| | | | | |
|---|---|---|---|---|
| 5,102,107 A | * | 4/1992 | Simon | F16F 1/366 248/621 |
| 5,478,058 A | * | 12/1995 | Tucchio | F16F 3/10 188/372 |
| 8,857,801 B2 | * | 10/2014 | Yoshioka | F16F 1/3665 267/149 |
| 2006/0186588 A1 | * | 8/2006 | White | A61F 2/442 267/148 |

FOREIGN PATENT DOCUMENTS

| | | | | |
|---|---|---|---|---|
| EP | 0132048 A1 | | 1/1985 | |
| FR | 2699630 A1 | * | 6/1994 | F16F 1/371 |

* cited by examiner

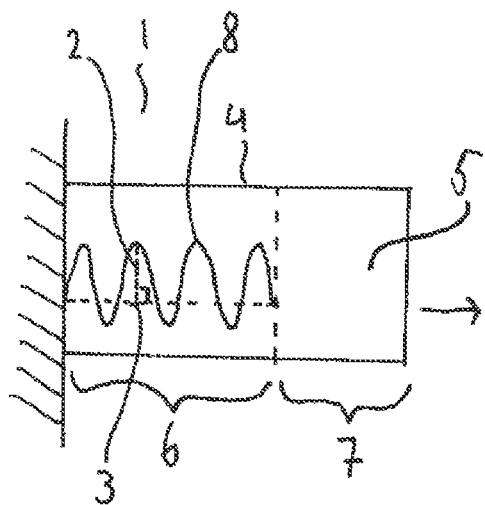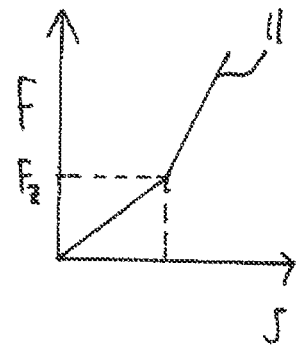
FIG. 1A
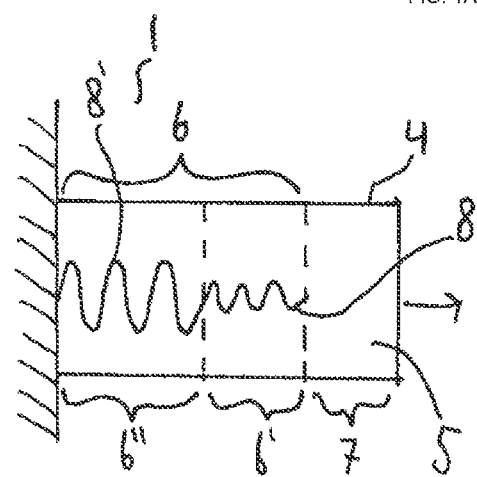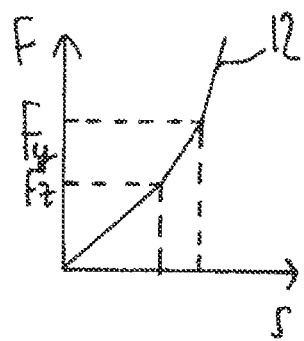
FIG 1B
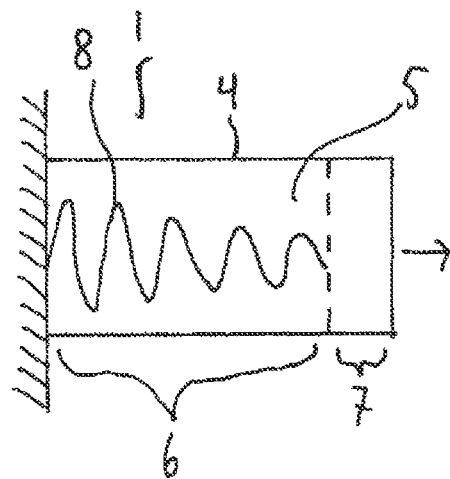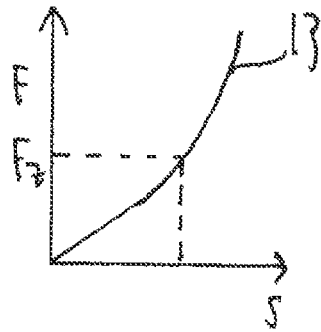
FIG. 1C

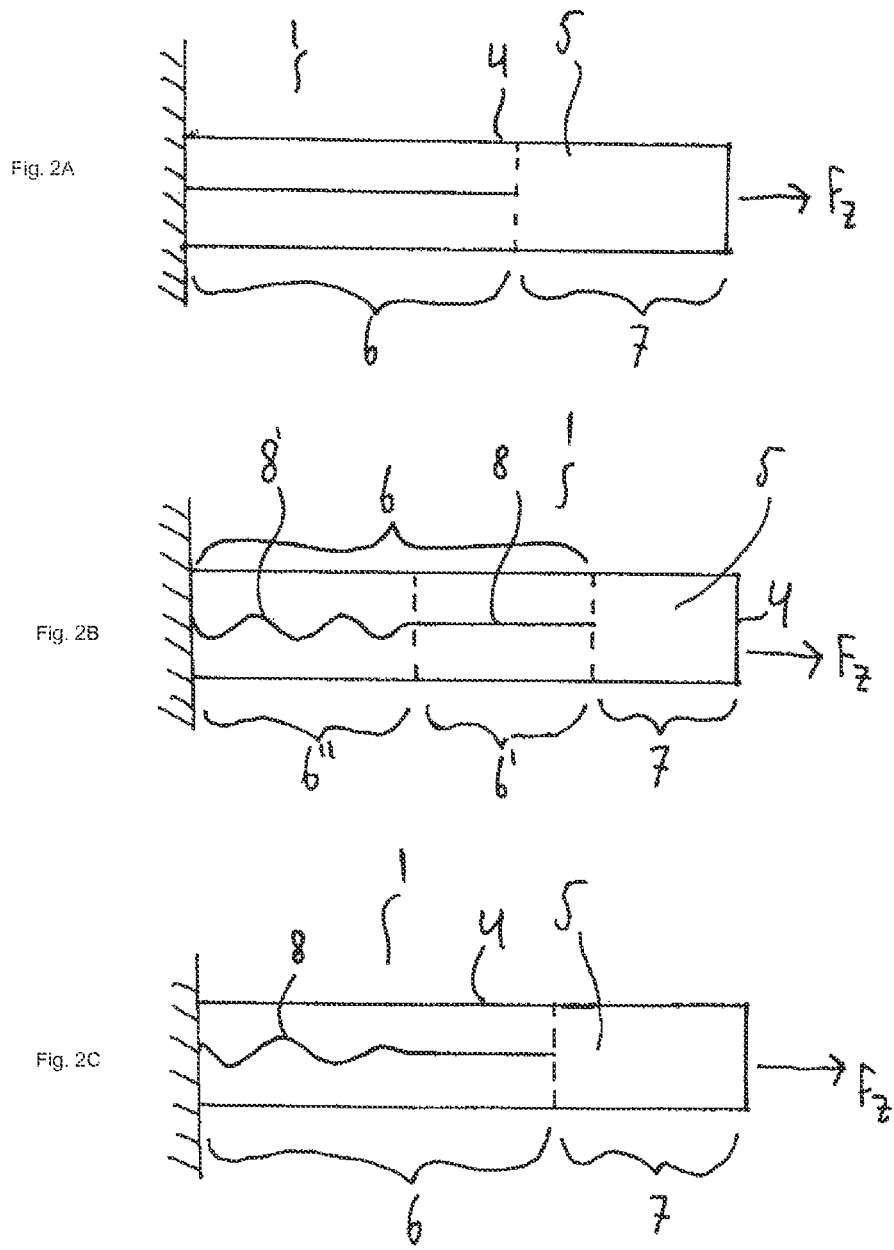

SPRING ELEMENT

CROSS-REFERENCE TO RELATED APPLICATION

This application claims priority to German Application No. 10 2013 224 442.8, filed Nov. 28, 2013, which is herein incorporated by reference in its entirety.

TECHNICAL FIELD

This disclosure relates to spring elements including spring elements with a progressive spring characteristic.

BACKGROUND

Various demands with regard to a necessary spring stiffness of spring elements are made in the loaded and unloaded condition with the application of resilient elements, i.e. with the mounting of structures in vehicle construction or rail vehicle construction. The stiffness is ideally dependent on the loading condition of the vehicle. Spring elements with a progressive spring characteristic are capable of solving this problem.

Spring elements with a progressive spring characteristic can be realised in many ways. Combinations of several helical springs, leaf springs and gas compression springs for example belong to the existing possibilities. Flexible springs, with which lever ratios change due to a deformation of the flexible springs display a corresponding behaviour. The mentioned spring elements however are characterised by a comparatively high complexity. Environmental influences such as humidity and dirt can lead to a disadvantageously high wear of such spring elements.

SUMMARY

The present disclosure describes a spring element with a non-linear spring characteristic which has a comparatively simple construction and which is low in wear.

In some embodiments, the spring element comprises a spring body which is at least chiefly formed from an elastomer and includes at least one reinforcement fibre embedded into the elastomer.

In some embodiments, the spring element comprises a spring body formed at least chiefly of an elastomer. At least one reinforcement fibre is embedded into the elastomer, wherein the at least one reinforcement fibre in a non-loaded condition (non-loaded state) of the spring element has an arcuate course, so that the spring element has a non-linear spring characteristic.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

Embodiments are explained by way of the attached figures.

FIG. 1A is a diagram illustrating a cross section of a spring element in an unloaded condition and spring characteristics of the spring element of FIG. 1A, according to some embodiments described in the disclosure.

FIG. 1B is a diagram illustrating a cross section of a spring element in an unloaded condition and spring characteristics of the spring element of FIG. 1B, according to some embodiments described in the disclosure.

FIG. 1C is a diagram illustrating a cross section of a spring element in an unloaded condition and spring characteristics of the spring element of FIG. 1C, according to some embodiments described in the disclosure.

FIG. 2A is a diagram illustrating a cross section of the spring element from the FIG. 1A, in a loaded condition, according to some embodiments described in the disclosure.

FIG. 2B is a diagram illustrating a cross section of the spring element from the FIG. 1B, in a loaded condition, according to some embodiments described in the disclosure.

FIG. 2C is a diagram illustrating a cross section of the spring element from the FIG. 1C, in a loaded condition, according to some embodiments described in the disclosure.

Recurring features are each provided with identical reference numerals in the figures.

Figure 3:
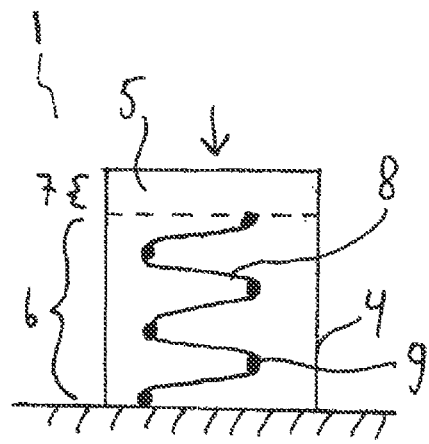
FIG. 3 is a diagram illustrating a cross section of a spring element with anchoring elements, according to some embodiments described in the disclosure.

While embodiments are amenable to various modifications and alternative forms, embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The spring body can consist of a monolithic component. The construction of the spring element is comparatively simple by way of this. Moreover, the spring element is largely insensitive to environmental influences such as moisture and dirt, due to the use of the elastomer. The desired non-linear spring characteristic in turn results due to the fact that the at least one reinforcement fibre embedded into the elastomer has an arcuate course in the non-loaded condition of the spring element and therefore with a deformation of the spring body in an environment of the unloaded condition firstly still has no or no significant influence on its elasticity.

Further, the spring body may comprise a solid body. The spring body may have a cylindrical, columnar, cuboid or rod-like shape at least in the non-loaded condition of the spring element. Further, the spring body may have a convex shape at least in the non-loaded condition of the spring element.

The at least one reinforcement fibre in contrast can be stretchable given a deformation of the spring body due to a loading of the spring element. The at least one reinforcement fibre can thus be shaped such that it increasingly stretches with an increasing loading. The at least one reinforcement fibre may be completely stretched at a predetermined loading of the spring element, i.e. at a predetermined external force acting on the spring element. As soon as the reinforcement fibre is stretched due to the loading, e.g., due to the predetermined loading, the spring body is much less capable of extending than an equally shaped spring body formed from an elastomer and without reinforcement fibre. As a result, the compliance of the spring body reduces. A non-linear spring characteristic of the spring element can thus be realised in a simple manner.

The at least one reinforcement fibre can be stretchable transverse to a compression direction—thus transverse to a direction of a compression direction, given a compressive loading of the spring element. It is likewise possible for the reinforcement fibre to be stretchable along a tension direction—thus along a direction of the tensile loading, given a tensile loading of the spring element. The at least one reinforcement fibre may be completely stretched transverse to a compression direction or along a tension direction given a predetermined compressive or tensile loading of the spring element. The spring element can thus be designed for a tensile loading or for a compressive loading or for both, depending on the course of the at least one reinforcement fibre.

An elasticity of the spring element in a non-loaded condition of the spring element can be determined essentially by an elasticity of the elastomer. In contrast, the spring body in a condition, in which the at least one reinforcement fibre is stretched due to a loading of the spring element, typically has a lower compliance or a greater stiffness than in the non-loaded condition. Thus a spring stiffness can be set in a manner depending on a loading of the spring element whilst utilising the arcuate course of the at least one reinforcement fibre.

One can envisage the at least one reinforcement fibre being embedded into a first region of the spring body, whereas a second region of the spring body is adjacent the first region, in which second region no reinforcement fibres or at most differently fashioned fibres is/are embedded into the elastomer, wherein the second region connects to the first region in the mentioned tension direction or compression direction. The at least one reinforcement fibre may extend laterally or longitudinally from a first end of the first region to a second end of the first region. The first and second regions of the spring body may each comprise a solid body. Further, the first and second regions of the spring body may each have a convex, cylindrical, columnar, cuboid or rod-like shape at least in a non-loaded condition (non-loaded state) of the spring element.

The two regions can be considered as springs connected in series due to the mentioned arrangement of the first region and the second region. A spring constant of the complete connection (equivalent spring constant) can be specified on joining together several springs. With two springs which are connected in series, the equivalent spring constant $k_\epsilon$ is defined via the relation $1/k_\epsilon = 1/k_1 + 1/k_2$. Hereby, $k_1$ and $k_2$ are spring constants of the first and the second region respectively. The spring constant of the first region $k_1$ can increase by a multiple given the presence of a stretched reinforcement fibre. The equivalent spring constant $k_\epsilon$ can then be approximately determined by the spring constant of the second region $k_2$. An elasticity of the spring body in a condition, in which the at least one reinforcement fibre is stretched, approximately corresponds to an elasticity of the second region. In some embodiments, the elasticity of the spring body thereby in this condition does not vary by more than 10% from the elasticity of the second region. In some embodiments, the elasticity of the spring body thereby in this condition does not vary by more than 5% from the elasticity of the second region The arcuate course of the at least one reinforcement fibre for example can be wave-shaped, spiral-shaped or zigzag-shaped. Moreover, the wave-shaped or spiral-shaped or zigzag-shaped course of the at least one reinforcement fibre in the non-loaded condition can have a non-constant amplitude and/or a non-constant wavelength. For example, a waved reinforcement fibre with a non-constant amplitude can already be stretched by way of loading in a region of the reinforcement fibre, whereas the course of the reinforcement fibre in another region is still waved. The compliance of the spring element in this case gradually reduces with an increasing loading, and the non-linear spring characteristic can have a smooth course without abruptly bent locations.

In some embodiments, the spring element comprises at least two reinforcing fibres which are arranged parallel next to one another or behind one another, with an arcuate course in the non-loaded condition. Thus under certain circumstances one can better ensure that the non-linear spring characteristic of the spring element has the respective desired course.

The term reinforcement fibre in the present document is to imply that the reinforcement fibre indeed reinforces the elastomer, thus in particular is formed from a material which is different to the elastomer. In some embodiments, a modulus of elasticity of the at least one reinforcement fibre in the fibre direction is 250 times larger than a modulus of elasticity of the elastomer. By way of this, one can succeed in the elasticity of the spring element differing by less than 10% from the elasticity of the second region of the elastomer, given a stretched reinforcement fibre. In some embodiments, the modulus of elasticity of the reinforcement fibre can be at least 500 times larger than the modulus of elasticity of the elastomer.

In some embodiments, the at least one reinforcement fibre is limp, i.e., loadable essentially only in tension, before embedding into the elastomer.

The at least one reinforcement fibre can, for example, have a length of at least 40 mm. As to how long the at least one reinforcement fibre is, will then depend on the size of the spring body. Thus the at least one reinforcement fibre can be selected such that its length is at least half as large as a smallest diameter of the spring body in the non-loaded condition. A longitudinal extension in the longitudinal direction of the reinforcement fibre in this disclosure is defined as a length of a straight-line path from one end of the reinforcement fibre to the other end of the reinforcement fibre. A ratio of longitudinal extension to the length of the reinforcement fibre, due to the arcuate course of the reinforcement fibre in the non-loaded condition has a value of smaller than one. In some embodiments, this ratio is smaller than 0.9. In some embodiments, this ratio is smaller than 0.8 or 0.7. This means that a distance between the two ends of the reinforcement fibre is, in the non-loaded state of the spring element, not more than 0.9 times a length of the reinforcement fibre or not more than 0.8 or 0.7 times the length of the reinforcement fibre.

A transverse extension of the reinforcement fibre in this disclosure is defined as an extension of the envelope of the course of the reinforcement fibre, measured perpendicularly to the path connecting the ends of the reinforcement fibre. The transverse extension can be a double amplitude of the wave, given a wave-shaped course of the at least one reinforcement fibre. In some embodiments, a ratio of the transverse extension to a wavelength of this wave can be at least 0.1. In some embodiments, this ratio of the transverse extension to the wavelength is smaller than 0.5.

The at least one reinforcement fibre can be fastened on at least one anchoring element, which is embedded into the elastomer. In some embodiments, the at least one reinforcement fibre is fastened on two, possible also more anchoring elements.

The at least one anchoring element can advantageously contribute to the reinforcement fibres stretching in a controlled manner on loading the spring element. Two ends of the at least one reinforcement fibre can be fastened in each case on one of the two anchoring elements, in the case that two anchoring elements are provided.

The at least one reinforcement fibre can be led around the at least one anchoring element. The anchoring element, for example, can be designed in a rod-like manner. Moreover, two reinforcement fibres can be led around the rod-like anchoring element at different locations.

In some embodiments, the non-linear spring characteristic is a progressive spring characteristic. The non-linear spring characteristics can also have an abruptly bent course. This, for example, is the case if the mentioned first region is designed with the at least one reinforcement fibre and the mentioned second region is designed without reinforcement fibre, in the spring body.

In some embodiments, the at least one reinforcement fibre includes at least one of a glass fibre, carbon fibre, aramid fibre, polyamide fibre, polyester fibre or natural fibre. In some embodiments, other fibres are likewise conceivable.

In some embodiments, the elastomer includes silicon rubber, polybutadiene rubber or vulcanised natural rubber or consists of one of the above materials.

In some embodiments, a multitude of reinforcement fibres are embedded into the elastomer, e.g., more than 10 or more than 100 or more than 1000. In some embodiments, if several reinforcement fibres are included, then these have an equally arcuate course or one which is arcuate in the same manner. The reinforcement fibres are then stretched in the same manner on deformation of the spring body due to the loading of the spring element. The non-linear spring characteristic of the spring element can be precisely set by way of this. Alternatively, in some embodiments, at least two different fibres are embedded into the elastomer, and these being different with regard to their courses or curvature.

The spring element for transmitting a compressive load or a tensile load onto the spring body can comprise at least one force transmission element which is partly embedded into the spring body or can be fastened on a surface of the spring element. A force acting on the spring element can be transmitted onto the spring element with the help of the force transmission element. A designated installation of the spring element, for example, a fastening or a suspension of the spring element, can be simplified by way of such force transmission elements. The force transmission element can be a plate which is fastened on the surface of the spring body or a plate which is partly admitted therein, under certain circumstances with a hook fastened thereto.

In some embodiments, several spring elements can be connected to one another in series or in parallel.

The spring element described above can be applied in a comprehensive manner. The spring element with a progressive characteristic can be designed for damping oscillations. A use of the spring element in a chassis of a vehicle is conceivable. The chassis then comprises at least one wheel suspension which comprises a spring element according to the previously described type. The spring element can also be used in a vehicle at other locations, for cushioning and/or damping. A use of the spring element described above is moreover conceivable in vibrating machines or in mechanical conveying means such as oscillator conveyors.

FIG. 1A is a diagram illustrating a roughly 120 mm long spring element 1 that comprises a spring body 4 formed at least chiefly of an elastomer 5, according to some embodiments described in the disclosure. A reinforcement fibre 8 with a length of about 150 mm is embedded into a first region 6 of the spring body 4. The reinforcement fibre 8 moreover has a transverse extension 2 of about 10 mm as well as a longitudinal extension 3 of about 100 mm.

The spring element 1 is shown in a non-loaded condition, such that no external force acts on the spring element 1. The reinforcement fibre 8 in the non-loaded condition of the spring element 1 has an arcuate course, wherein the arcuate course of the reinforcement fibre 8 is wave-shaped (undulated). The course of the reinforcement fibre 8 can also be spiral-shaped (helical) as an alternative to the shown wave-like course. The reinforcement fibre 8 of the spring element 1 from FIG. 1A is stretchable along a tension direction characterised by an arrow, given a tensile loading. A second region 7 of the spring body 4 is adjacent the first region 6 of the spring body 4, wherein no reinforcement fibre 8 is embedded into the elastomer 5 in this second region 7 of the spring body 4. The second region 7 of the spring body 4 thereby connects onto the first region 6 of the spring body 4 in the mentioned tension direction.

The manner of acting of the spring element 1 is explained by way of FIG. 2A. FIG. 2A is a diagram illustrating the spring element 1 in a loaded condition, according to some embodiments described in the disclosure. The spring body 4 is extended (longitudinal expansion) in the tension direction compared to the unloaded condition, on account of the tensile loading $F_z$ onto the spring element 1 in the arrow direction. The spring body 4 is moreover compressed (transverse contraction) transversely the tensile loading on account of this. The reinforcement fibre 8 of the spring element 1 is stretched in the tension direction by way of this. That is, the reinforcement fibre 8 is completely stretched given a predetermined loading of the spring element 1. A compliance of the first region 6 is much smaller than a compliance of the first region 6 in a condition, in which the course of the reinforcement fibre 8 is wave-shaped, on account of the stretched reinforcement fibre 8. As a result, the spring body 4 in a condition, in which the reinforcement fibre 8 is stretched by way of a loading of the spring element 1, has a lower compliancy than in the non-loaded condition. An effective modulus of elasticity of the first region 7 of the spring body is about 20 kN/mm$^2$ in the condition, in which the reinforcement fibre 8 is stretched by a loading of the spring element 1. In the non-loaded condition of the spring element 1, the effective modulus of elasticity of the first region 7 of the spring body 4 is about 0.1 kN/mm$^2$. The spring body 4 in the second region 8 has a modulus of elasticity of about 0.1 kN/mm$^2$ largely independently of the loading.

A diagram with a spring characteristic 11 of the spring element 1 is shown in FIG. 1A to the right next to the spring element 1. Hereby, one can clearly recognise that the spring characteristic 11 has a non-linear course. With the shown spring characteristic 11, a spring force F of the spring element 1 increases over-proportionally with a deformation s of the spring element 1, i.e. the non-linear spring characteristic 11 is progressive. For this reason, the spring characteristic 11 displays an angled bend location which is caused by the stretching of the reinforcement fibre 8 at this tensile force $F_z$.

The spring element 1 shown in FIG. 1B differs from the spring element 1 of FIG. 1A in that two reinforcement fibres 8 and 8' are arranged in parallel one after the other in each case in the region 6' and 6" respectively, in the spring body 4, wherein the courses of the two reinforcement fibres 8 and 8' have different periods as well as different amplitudes. Instead, a single reinforcement fibre 9 could also be applied in this manner, thus with two courses of a different period and amplitude in two consecutive sections. The spring element is shown in the non-loaded condition in FIG. 1B. In contrast, a tensile force $F_z$ is exerted onto the spring element 1 of FIG. 1B in FIG. 2B. In FIG. 2B, the reinforcement fibre 8 with the lower period/amplitude tends to stretch more than the reinforcement fibre 8' with the greater period/amplitude, on loading the spring element 1. The spring characteristic 12 of the spring element 1 which is shown in the diagram of FIG. 1B has two abrupt bend locations for this reason. The reinforcement fibre 8' is also stretched (not shown) by way of exerting a tensile force $F_y$ which with regard to magnitude is larger than the tensile force $F_z$ and which corresponds to a force $F_y$ at the second abrupt bend location of the spring characteristics 12, onto the spring element. Thus both reinforcement fibres 8 and 8' are stretched at this force $F_y$ or at greater tensile forces.

With the spring element 1 shown in FIG. 1C, the wave-like course of the reinforcement fibre 8 has a continuously changing non-constant amplitude in the non-loaded condition, in contrast to the spring elements 1 of FIGS. 1A and 1B. Hereby, the mentioned amplitude in the spring body 4 of the spring element 1 continuously decreases in the longitudinal direction of the spring body. The spring characteristic 13 of the spring element 1 of FIG. 1C thus has no abrupt bend locations, but has a continuously increasing gradient. This spring characteristic 13 is thus also progressive. The non-loaded spring element 1 of FIG. 1C is shown in FIG. 2C subjected to a tensile loading $F_2$. The reinforcement fibre 8 is partly stretched due to the tensile loading $F_2$.

FIG. 3 is a diagram illustrating a further spring element 1 in its non-loaded condition, according to some embodiments described in the disclosure. This spring element 1 also comprises a spring body 4 which is formed from an elastomer 5, and an arcuate reinforcement fibre 8 which is embedded therein. The reinforcement fibre 8 of this spring element 1 is fastened on six anchoring elements 9 which are embedded into the elastomer 5. The anchoring elements 9 are designed in a rod-like manner, wherein the rod-like anchoring elements 9 are aligned perpendicularly to the plane of the drawing. The reinforcement fibre 8 is led around the anchoring element 9. In the shown example, the anchoring element is manufactured of metal, preferably of steel. The spring body 4 shortens in the compression direction (length contraction) due to the compressive loading of the spring body 4. Thereby, the spring body 4 extends transversely to the compression direction (transverse expansion) under compressive loading. The reinforcement fibre 8 as a result is stretchable transverse to the compression direction, particularly with a deformation of the spring body 4 due to pressure loading. A transverse stiffness of the first region 6 of the spring body 4 increases as soon as the reinforcement fibre 8 is stretched in a loaded condition of the spring element 1, such that the compliance or stiffness of the spring body 4 is determined essentially by the compliance and stiffness respectively of the second region 7 of the spring body 4. The spring body 4 can shorten to a lesser extent in the compression direction due to the increased transverse stiffness of the first region 6. As a result, a longitudinal stiffness of the spring body 4 parallel to the compression direction will likewise increase. The spring element 1 has a non-linear spring characteristic with a progressive course under compressive loading as a result of this.

Figure 4:
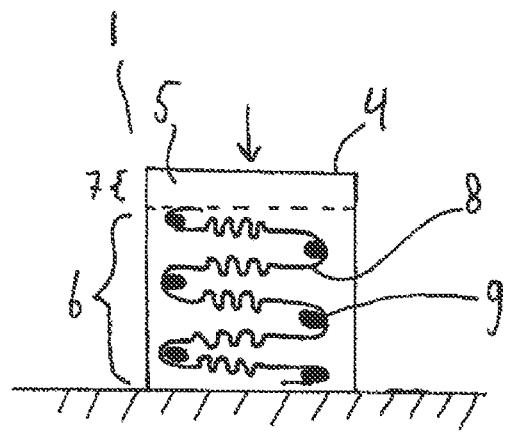
FIG. 4 is a diagram illustrating a cross section of a further spring element with anchoring elements, according to some embodiments described in the disclosure.

The spring element 1 shown in FIG. 4 which is shown there in the non-loaded condition differs from the spring element 1 shown in FIG. 3 by way of the fact that a course of the reinforcement fibre 8 is wave-shaped in sections between two anchoring elements 9 in each case. The reinforcement fibre 8 thus in the wave-shaped sections is stretchable transverse to the compression direction with a deformation of the spring body 4 due to compressive loading. A transverse stiffness of the first region 6 of the spring body 4 transverse to the compression direction in a condition of the spring body 4, in which the reinforcement fibre 8 is stretched, has a greater value compared with a transverse stiffness of the first region 6 of the spring body 4 in the non-loaded condition. Thus the spring element shown in FIG. 4 also has a non-linear spring characteristic with a progressive course under compressive loading.

Figure 5:
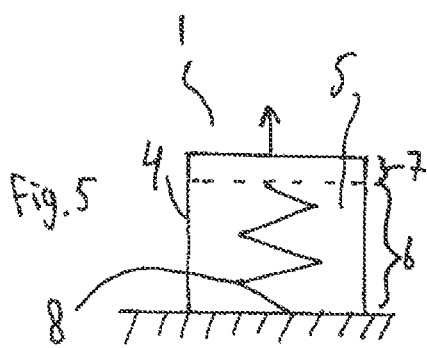
FIG. 5 is a diagram illustrating a cross section of a spring element with a zigzag-shaped reinforcement fibre, according to some embodiments described in the disclosure.

The spring element 1 shown in FIG. 5 differs from the first spring element 1 shown in FIG. 1A only by way of the fact the reinforcement fibre 8 has a zigzag-shaped course in the non-loaded condition. The course of the reinforcement fibre 8, in particular with a tensile loading is stretchable in the arrow direction, as with the spring element 1 of FIG. 1A.

Figure 6:
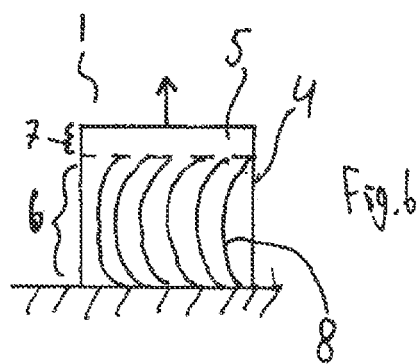
FIG. 6 is a diagram illustrating a cross section of a spring element with a multitude of reinforcement fibres running in an arched manner, according to some embodiments described in the disclosure.

Six reinforcement fibres 8 are embedded into the elastomer 5 with the spring element 1 shown in FIG. 6. The reinforcement fibres 8 are arranged in a manner parallel next to one another and each have an arched course in the non-loaded condition of the spring element 1. In this case, a tensile stretching of the spring element 1 leads to a stretching of the reinforcement fibre 8, similarly to the embodiment examples of FIGS. 1A-C and 2A-C. The stiffness of the spring body 4 in a condition, in which the six reinforcement fibres 8 are stretched by a loading of the spring element 1, is greater than the stiffness of an equally shaped spring body 4 with a single reinforcement fibre 8 stretched due to loading, on account of the parallel arrangement of six reinforcement fibres 8.

Figure 7:
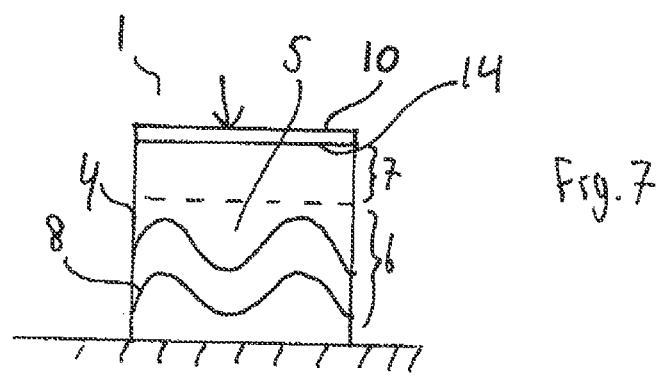
FIG. 7 is a diagram illustrating a cross section of a spring element with a force transmission element which is formed as a compression plate, according to some embodiments described in the disclosure.

The spring element 1 which is shown in FIG. 7 is preferably loadable in the arrow direction under compressive loading. As in the FIGS. 3 and 4, the reinforcement fibres 8 are stretchable transversely to the compression direction given a deformation of the spring body 4 by way of a compressive loading. A force transmission element 10 designed as a pressure plate is fastened on a surface 14 of the spring body 4. The compressive loading can be distributed uniformly onto the surface 14 of the spring body 4 by way of this force transmission element 10.

Figure 8:
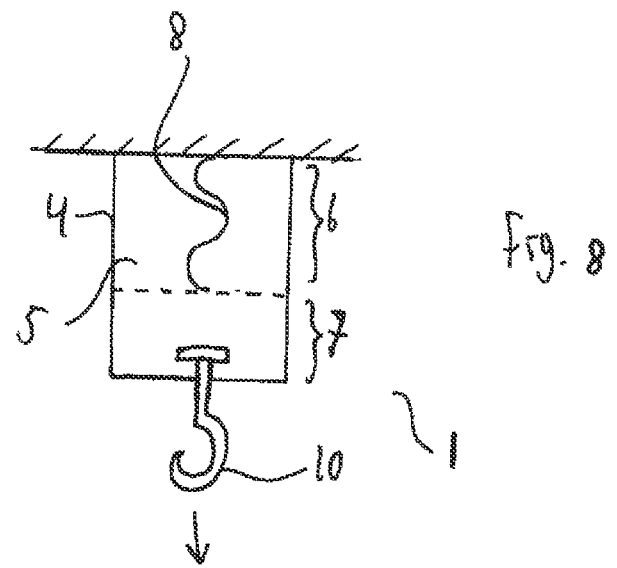
FIG. 8 is a diagram illustrating a cross section of a further spring element with a force transmission element designed as a hook, according to some embodiments described in the disclosure.

A spring element 1 with a force transmission element 10 designed as a hook is shown in FIG. 8, wherein the force transmission element 10 is partly embedded into the spring body 4 and is thus anchored in the spring body 4. A tensile loading can be transmitted onto the spring body 4 in the direction of the arrow by way of the force transmission element 10. The reinforcement fibre 8 in a further embodiment can also be fastened on the force transmission element 10. Otherwise, the manner of functioning of the spring element 1 of FIG. 8 is the same as the manner of functioning of the spring element 1 of FIG. 1A.

Maximally, six reinforcement fibres 8 are shown in each spring body 4 in the FIGS. 1 to 8, for the purpose of a better overview. However, it is evident that a greater number of reinforcement fibres 8, e.g. more than 1000 reinforcement fibres 8 can be embedded into the elastomer 5.

The reinforcement fibres 8 of the above examples are each glass fibres with a modulus of elasticity of 60 kN/mm² in the fibre direction. With regard to the elastomer 5 which is used in the embodiment examples, it is the case of silicone rubber with a modulus of elasticity of 0.1 kN/mm². The modulus of elastic of the reinforcement fibres 8 is thus 600 times greater than the modulus of elasticity of the elastomer 5.

In other embodiments, it is possible to use reinforcement fibres 8 of different materials. Carbon fibres, aramid fibres, polyamide fibres, polyester fibres or natural fibres are conceivable for example. The elastomer 5 can also be given for example by natural rubber, vulcanised rubber or polybutadiene rubber instead of the silicone rubber.

The spring body 4 of the spring elements 1 shown in the figures comprises a solid body and has a cylindrical, slight convex shape in the non-loaded condition of the spring elements 1. In other embodiments, the shape of the spring body 4 may also be columnar, cuboid or rod-like.

The spring elements 1 which are shown in the figures can be used for example for the suspension of a vehicle and thereby simultaneously serve for shock-absorbing under certain circumstances. A chassis of the vehicle then comprises at least one wheel suspension which comprises a spring element 1 of one of the shown examples.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A spring element comprising a spring body which is at least chiefly formed from an elastomer, wherein at least one reinforcement fibre is embedded into the elastomer, the at least one reinforcement fibre having an arcuate course in a non-loaded condition of the spring element and the at least one reinforcement fibre completely stretched given a predetermined loading of the spring element, such that the spring element has a non-linear spring characteristic, wherein the at least one reinforcement fibre is at least one of stretchable transversely to a compression direction given a compressive loading of the spring element and stretchable along a tension direction given a tensile loading of the spring element, and wherein the at least one reinforcement fibre is embedded into a first region of the spring body, and a second region of the spring body is adjacent to the first region, wherein no reinforcement fibre is embedded into the elastomer in the second region of the spring body, wherein the second region connects to the first region in one of the tension direction and the compression direction.

2. The spring element according to claim 1, wherein a distance between the two ends of the reinforcement fibre is, in the non-loaded condition of the spring element, at least one of not more than 0.9, not more than 0.8, and not more than 0.7 times a length of the reinforcement fibre.

3. The spring element according to claim 1, wherein in a condition, in which the at least one reinforcement fibre is stretched by way of a loading of the spring element, the spring body has a lower compliance than in the non-loaded condition.

4. The spring element according to claim 1, wherein the arcuate course of the at least one reinforcement fibre is at least one of helical, wave-shaped, spiral-shaped, and zigzag-shaped.

5. The spring element according to claim 4, wherein the at least one of helical, wave-shaped, spiral-shaped, and zigzag-shaped course of the at least one reinforcement fibre in the non-loaded condition has at least one of a non-constant amplitude and a non-constant wavelength.

6. The spring element according to claim 1 having at least two reinforcement fibres which are arranged parallel one of next to one another and after one another, with an arcuate course in the non-loaded condition.

7. The spring element according to claim 1, wherein a modulus of elasticity of the at least one reinforcement fibre in the fibre direction is at least 250 times larger than a modulus of elasticity of the elastomer.

8. The spring element according to claim 1, wherein the at least one reinforcement fibre is fastened on at least one anchoring element which is embedded into the elastomer.

9. The spring element according to claim 8, wherein the anchoring element is rod-like, wherein the at least one reinforcement fibre is led around the at least one anchoring element.

10. The spring element according to claim 1, wherein the non-linear spring characteristic is at least one of a progressive spring characteristic and having an abruptly bent course.

11. The spring element according to claim 1, wherein for transmitting a compressive or tensile loading onto the spring body, it comprises at least one force transmission element which is at least one of partly embedded into the spring body and fastened on a surface of the spring body.

12. The spring element according to claim 1, wherein the spring body has at least one of a cylindrical, columnar, cuboid, and rod-like shape at least in the non-loaded condition of the spring element.

13. The spring element according to claim 1, wherein the spring body has a convex shape at least in the non-loaded condition.

14. The spring element according to claim 1, wherein the at least one reinforcement fibre extends one of laterally and longitudinally from a first end of the first region to a second end of the first region.

15. A vehicle with a chassis which comprises at least one wheel suspension having a spring element according to claim 1.

16. The spring element according to claim 1, wherein the at least one reinforcement fibre includes at least one of a glass fibre, a carbon fibre, an aramid fibre, a polyamide fibre, a polyester fibre, and a natural fibre.

* * * * *